United States Patent
Ross et al.

(10) Patent No.: US 11,818,152 B2
(45) Date of Patent: *Nov. 14, 2023

(54) MODELING TOPIC-BASED MESSAGE-ORIENTED MIDDLEWARE WITHIN A SECURITY SYSTEM

(71) Applicant: vArmour Networks, Inc., Los Altos, CA (US)

(72) Inventors: Colin Ross, Arlington, TX (US); Marc Woolward, Bude (GB); Keith Stewart, San Francisco, CA (US)

(73) Assignee: vArmour Networks, Inc., Los Altos, CA (US)

( * ) Notice: Subject to any disclaimer, the term of this patent is extended or adjusted under 35 U.S.C. 154(b) by 348 days.

This patent is subject to a terminal disclaimer.

(21) Appl. No.: 17/133,451

(22) Filed: Dec. 23, 2020

(65) Prior Publication Data

US 2022/0201024 A1    Jun. 23, 2022

(51) Int. Cl.
*H04L 9/40* (2022.01)
*G06F 30/20* (2020.01)

(52) U.S. Cl.
CPC ......... *H04L 63/1425* (2013.01); *G06F 30/20* (2020.01); *H04L 63/1416* (2013.01); *H04L 63/1441* (2013.01); *H04L 63/20* (2013.01)

(58) Field of Classification Search
USPC .......................................................... 726/1
See application file for complete search history.

(56) References Cited

U.S. PATENT DOCUMENTS 6,158,007 A * 12/2000 Moreh ................... H04L 63/20
                                                                726/1
6,253,321 B1    6/2001 Nikander et al.
(Continued)

FOREIGN PATENT DOCUMENTS

TW    201642616 A    12/2016
TW    201642617 A    12/2016
(Continued)

OTHER PUBLICATIONS

Badidi et al.; A Cloud-based Approach for Context Information Provisioning; World of Computer Science and Information Technology Journal (WCSIT) (Year: 2011).*
(Continued)

*Primary Examiner* — Amare F Tabor
*Assistant Examiner* — Mahabub S Ahmed
(74) *Attorney, Agent, or Firm* — Carr & Ferrell LLP (57) ABSTRACT

A system and a method for modeling topic-based message-oriented middleware (MoM) are provided. The method commences with connecting with a MoM system and converting information associated with the MoM system into a standardized object model. The standardized object model may include a topic-based node associated with a topic, at least one producer application, and at least one consumer application. The at least one producer application provides one or more messages related to the topic to the topic-based node. The at least one consumer application receives the one or more messages from the topic-based node. The method continues with generating a standardized graph of relationships between producers and consumers over a period of time. The method further includes creating a policy, periodically analyzing the standardized graph for at least one deviation from the policy, and issuing an alert in response to detecting the at least one deviation.

20 Claims, 5 Drawing Sheets

(56) References Cited

U.S. PATENT DOCUMENTS

| | | |
|---|---|---|
| 6,484,261 B1 | 11/2002 | Wiegel |
| 6,578,076 B1 | 6/2003 | Putzolu |
| 6,765,864 B1 | 7/2004 | Natarajan et al. |
| 6,832,243 B1 * | 12/2004 | Mikalsen ............ G06F 11/0772 709/224 |
| 6,970,459 B1 | 11/2005 | Meier |
| 6,981,155 B1 | 12/2005 | Lyle et al. |
| 7,058,712 B1 | 6/2006 | Vasko et al. |
| 7,062,566 B2 | 6/2006 | Amara et al. |
| 7,096,260 B1 | 8/2006 | Zavalkovsky et al. |
| 7,373,524 B2 | 5/2008 | Motsinger et al. |
| 7,397,794 B1 | 7/2008 | Lacroute et al. |
| 7,467,408 B1 | 12/2008 | O'Toole, Jr. |
| 7,475,424 B2 | 1/2009 | Lingafelt et al. |
| 7,516,476 B1 | 4/2009 | Kraemer et al. |
| 7,519,062 B1 | 4/2009 | Kloth et al. |
| 7,533,128 B1 * | 5/2009 | Sanchez ................ G06F 16/20 707/999.102 |
| 7,627,671 B1 | 12/2009 | Palma |
| 7,694,181 B2 | 4/2010 | Noller et al. |
| 7,725,937 B1 | 5/2010 | Levy |
| 7,742,414 B1 | 6/2010 | Iannaccone et al. |
| 7,774,837 B2 | 8/2010 | McAlister |
| 7,797,306 B1 * | 9/2010 | Pather ................ H04L 12/1859 707/732 |
| 7,849,495 B1 | 12/2010 | Huang et al. |
| 7,900,240 B2 | 3/2011 | Terzis et al. |
| 7,904,454 B2 | 3/2011 | Raab |
| 7,996,255 B1 | 8/2011 | Shenoy et al. |
| 8,051,460 B2 | 11/2011 | Lum et al. |
| 8,112,304 B2 | 2/2012 | Scates |
| 8,254,381 B2 | 8/2012 | Allen et al. |
| 8,259,571 B1 | 9/2012 | Raphel |
| 8,291,495 B1 | 10/2012 | Burns et al. |
| 8,296,459 B1 | 10/2012 | Brandwine et al. |
| 8,307,422 B2 | 11/2012 | Varadhan et al. |
| 8,321,862 B2 | 11/2012 | Swamy et al. |
| 8,353,021 B1 | 1/2013 | Satish et al. |
| 8,369,333 B2 | 2/2013 | Hao et al. |
| 8,396,986 B2 | 3/2013 | Kanada et al. |
| 8,429,647 B2 | 4/2013 | Zhou |
| 8,468,113 B2 | 6/2013 | Harrison et al. |
| 8,490,153 B2 | 7/2013 | Bassett et al. |
| 8,494,000 B1 | 7/2013 | Nadkarni et al. |
| 8,499,330 B1 | 7/2013 | Albisu et al. |
| 8,528,091 B2 | 9/2013 | Bowen et al. |
| 8,539,548 B1 | 9/2013 | Overby, Jr. et al. |
| 8,565,118 B2 | 10/2013 | Shukla et al. |
| 8,612,744 B2 | 12/2013 | Shieh |
| 8,661,434 B1 | 2/2014 | Liang et al. |
| 8,677,496 B2 | 3/2014 | Wool |
| 8,688,491 B1 | 4/2014 | Shenoy et al. |
| 8,726,343 B1 | 5/2014 | Borzycki et al. |
| 8,730,963 B1 | 5/2014 | Grosser, Jr. et al. |
| 8,798,055 B1 | 8/2014 | An |
| 8,813,169 B2 | 8/2014 | Shieh |
| 8,813,236 B1 | 8/2014 | Saha et al. |
| 8,819,762 B2 | 8/2014 | Harrison et al. |
| 8,898,788 B1 | 11/2014 | Aziz et al. |
| 8,935,457 B2 | 1/2015 | Feng et al. |
| 8,938,782 B2 | 1/2015 | Sawhney et al. |
| 8,990,371 B2 | 3/2015 | Kalyanaraman et al. |
| 9,009,829 B2 | 4/2015 | Stolfo et al. |
| 9,015,299 B1 | 4/2015 | Shah |
| 9,021,546 B2 | 4/2015 | Banerjee |
| 9,027,077 B1 | 5/2015 | Bharali et al. |
| 9,036,639 B2 | 5/2015 | Zhang |
| 9,060,025 B2 | 6/2015 | Xu |
| 9,141,625 B1 | 9/2015 | Thornewell et al. |
| 9,191,327 B2 | 11/2015 | Shieh et al. |
| 9,258,275 B2 | 2/2016 | Sun et al. |
| 9,294,302 B2 | 3/2016 | Sun et al. |
| 9,294,442 B1 | 3/2016 | Lian et al. |
| 9,361,089 B2 | 6/2016 | Bradfield et al. |
| 9,380,027 B1 | 6/2016 | Lian et al. |
| 9,405,665 B1 | 8/2016 | Shashi et al. |
| 9,407,602 B2 | 8/2016 | Feghali et al. |
| 9,521,115 B1 | 12/2016 | Woolward |
| 9,609,083 B2 | 3/2017 | Shieh |
| 9,621,595 B2 | 4/2017 | Lian et al. |
| 9,680,852 B1 | 6/2017 | Wager et al. |
| 9,762,599 B2 | 9/2017 | Wager et al. |
| 9,794,289 B1 | 10/2017 | Banerjee et al. |
| 9,973,472 B2 | 5/2018 | Woolward et al. |
| 10,009,317 B2 | 6/2018 | Woolward |
| 10,009,381 B2 | 6/2018 | Lian et al. |
| 10,091,238 B2 | 10/2018 | Shieh et al. |
| 10,116,441 B1 | 10/2018 | Rubin et al. |
| 10,191,758 B2 | 1/2019 | Ross et al. |
| 10,193,929 B2 | 1/2019 | Shieh et al. |
| 10,264,025 B2 | 4/2019 | Woolward |
| 10,333,827 B2 | 6/2019 | Xu et al. |
| 10,333,986 B2 | 6/2019 | Lian et al. |
| 10,382,467 B2 | 8/2019 | Wager et al. |
| 10,528,897 B2 | 1/2020 | Labat et al. |
| 10,554,604 B1 * | 2/2020 | Burcham ............ H04L 43/0817 |
| 10,630,703 B1 | 4/2020 | Ghosh et al. |
| 10,755,334 B2 | 8/2020 | Eades et al. |
| 10,862,748 B1 | 12/2020 | Deruijter |
| 11,194,815 B1 | 12/2021 | Kumar et al. |
| 11,290,493 B2 | 3/2022 | Woolward et al. |
| 11,290,494 B2 | 3/2022 | Li et al. |
| 11,310,284 B2 | 4/2022 | Woolward et al. |
| 11,470,684 B2 * | 10/2022 | Hu ........................ H04W 76/14 |
| 11,711,374 B2 | 7/2023 | Ross et al. |
| 2002/0031103 A1 | 3/2002 | Wiedeman et al. |
| 2002/0066034 A1 | 5/2002 | Schlossberg et al. |
| 2002/0178273 A1 * | 11/2002 | Pardo-Castellote .... H04L 67/12 709/230 |
| 2003/0055950 A1 | 3/2003 | Cranor et al. |
| 2003/0172368 A1 * | 9/2003 | Alumbaugh .............. G06F 8/71 717/106 |
| 2003/0177389 A1 | 9/2003 | Albert et al. |
| 2003/0227392 A1 * | 12/2003 | Ebert ...................... G06Q 10/08 340/8.1 |
| 2004/0062204 A1 | 4/2004 | Bearden et al. |
| 2004/0095897 A1 | 5/2004 | Vafaei |
| 2004/0143631 A1 * | 7/2004 | Banerjee ................ H04L 69/329 709/206 |
| 2004/0172557 A1 | 9/2004 | Nakae et al. |
| 2004/0240458 A1 * | 12/2004 | T V .................... H04L 67/1001 370/351 |
| 2005/0021943 A1 | 1/2005 | Ikudome et al. |
| 2005/0033989 A1 | 2/2005 | Poletto et al. |
| 2005/0114829 A1 | 5/2005 | Robin et al. |
| 2005/0119905 A1 * | 6/2005 | Wong ...................... G06Q 10/10 705/50 |
| 2005/0125768 A1 * | 6/2005 | Wong ...................... G06Q 10/06 717/100 |
| 2005/0154576 A1 | 7/2005 | Tarui |
| 2005/0174235 A1 | 8/2005 | Davis et al. |
| 2005/0190758 A1 | 9/2005 | Gai et al. |
| 2005/0201343 A1 | 9/2005 | Sivalingham et al. |
| 2005/0246241 A1 | 11/2005 | Irizarry, Jr. et al. |
| 2005/0283823 A1 | 12/2005 | Okajo et al. |
| 2006/0005228 A1 | 1/2006 | Matsuda |
| 2006/0037077 A1 | 2/2006 | Gadde et al. |
| 2006/0050696 A1 | 3/2006 | Shah et al. |
| 2006/0085412 A1 * | 4/2006 | Johnson ................ G06F 16/256 |
| 2006/0168070 A1 * | 7/2006 | Thompson ............... H04L 51/04 709/206 |
| 2006/0168331 A1 * | 7/2006 | Thompson ............... G06F 9/546 709/238 |
| 2007/0016945 A1 | 1/2007 | Bassett et al. |
| 2007/0019621 A1 | 1/2007 | Perry et al. |
| 2007/0022090 A1 | 1/2007 | Graham |
| 2007/0027801 A1 * | 2/2007 | Botzer ...................... G06Q 40/04 705/39 |
| 2007/0064617 A1 | 3/2007 | Reves |
| 2007/0079308 A1 | 4/2007 | Chiaramonte et al. |
| 2007/0130566 A1 | 6/2007 | Van Rietschote |
| 2007/0157286 A1 | 7/2007 | Singh et al. |
| 2007/0162400 A1 | 7/2007 | Brew et al. |

(56) References Cited

U.S. PATENT DOCUMENTS

| | | |
|---|---|---|
| 2007/0168971 A1 | 7/2007 | Royzen et al. |
| 2007/0192861 A1 | 8/2007 | Varghese et al. |
| 2007/0192863 A1 | 8/2007 | Kapoor et al. |
| 2007/0198656 A1 | 8/2007 | Mazzaferri et al. |
| 2007/0234369 A1* | 10/2007 | Paramisivam ......... G06Q 10/06 719/313 |
| 2007/0239987 A1 | 10/2007 | Hoole et al. |
| 2007/0271612 A1 | 11/2007 | Fang et al. |
| 2007/0277222 A1 | 11/2007 | Pouliot |
| 2008/0016339 A1 | 1/2008 | Shukla |
| 2008/0016550 A1 | 1/2008 | McAlister |
| 2008/0083011 A1 | 4/2008 | McAlister et al. |
| 2008/0155239 A1 | 6/2008 | Chowdhury et al. |
| 2008/0163207 A1 | 7/2008 | Reumann et al. |
| 2008/0195670 A1 | 8/2008 | Boydstun |
| 2008/0229382 A1 | 9/2008 | Vitalos |
| 2008/0239961 A1 | 10/2008 | Hilerio et al. |
| 2008/0263179 A1* | 10/2008 | Buttner ................. G06F 16/957 707/E17.119 |
| 2008/0301770 A1 | 12/2008 | Kinder |
| 2008/0307110 A1 | 12/2008 | Wainner et al. |
| 2009/0006268 A1 | 1/2009 | Tanner |
| 2009/0077621 A1* | 3/2009 | Lang ....................... H04L 63/10 726/1 |
| 2009/0077666 A1 | 3/2009 | Chen et al. |
| 2009/0083445 A1 | 3/2009 | Ganga |
| 2009/0138316 A1 | 5/2009 | Weller et al. |
| 2009/0138590 A1 | 5/2009 | Lee et al. |
| 2009/0165078 A1 | 6/2009 | Samudrala et al. |
| 2009/0190585 A1 | 7/2009 | Allen et al. |
| 2009/0249470 A1 | 10/2009 | Litvin et al. |
| 2009/0260051 A1 | 10/2009 | Igakura |
| 2009/0268667 A1 | 10/2009 | Gandham et al. |
| 2009/0328187 A1 | 12/2009 | Meisel |
| 2010/0043068 A1 | 2/2010 | Varadhan et al. |
| 2010/0064341 A1 | 3/2010 | Aldera |
| 2010/0071025 A1 | 3/2010 | Devine et al. |
| 2010/0088738 A1 | 4/2010 | Birnbach |
| 2010/0095367 A1 | 4/2010 | Narayanaswamy |
| 2010/0125476 A1* | 5/2010 | Yeom ..................... G06Q 10/087 707/E17.014 |
| 2010/0191863 A1 | 7/2010 | Wing |
| 2010/0192223 A1 | 7/2010 | Ismael et al. |
| 2010/0192225 A1 | 7/2010 | Ma et al. |
| 2010/0199349 A1 | 8/2010 | Ellis |
| 2010/0208699 A1 | 8/2010 | Lee et al. |
| 2010/0228962 A1 | 9/2010 | Simon et al. |
| 2010/0235880 A1 | 9/2010 | Chen et al. |
| 2010/0274970 A1 | 10/2010 | Treuhaft et al. |
| 2010/0281539 A1 | 11/2010 | Burns et al. |
| 2010/0287544 A1 | 11/2010 | Bradfield et al. |
| 2010/0333165 A1 | 12/2010 | Basak et al. |
| 2011/0003580 A1 | 1/2011 | Belrose et al. |
| 2011/0022812 A1 | 1/2011 | van der Linden et al. |
| 2011/0069710 A1 | 3/2011 | Naven et al. |
| 2011/0072486 A1 | 3/2011 | Hadar et al. |
| 2011/0090915 A1 | 4/2011 | Droux et al. |
| 2011/0113472 A1 | 5/2011 | Fung et al. |
| 2011/0138384 A1 | 6/2011 | Bozek et al. |
| 2011/0138441 A1 | 6/2011 | Neystadt et al. |
| 2011/0184993 A1 | 7/2011 | Chawla et al. |
| 2011/0225624 A1 | 9/2011 | Sawhney et al. |
| 2011/0249679 A1 | 10/2011 | Lin et al. |
| 2011/0263238 A1 | 10/2011 | Riley et al. |
| 2012/0017258 A1 | 1/2012 | Suzuki |
| 2012/0113989 A1 | 5/2012 | Akiyoshi |
| 2012/0130936 A1 | 5/2012 | Brown et al. |
| 2012/0131685 A1 | 5/2012 | Broch et al. |
| 2012/0185913 A1 | 7/2012 | Martinez et al. |
| 2012/0207174 A1 | 8/2012 | Shieh |
| 2012/0210428 A1* | 8/2012 | Blackwell ............... G06F 16/23 726/23 |
| 2012/0216273 A1 | 8/2012 | Rolette et al. |
| 2012/0224057 A1* | 9/2012 | Gill ....................... G06Q 10/063 348/143 |
| 2012/0278903 A1 | 11/2012 | Pugh |
| 2012/0284792 A1 | 11/2012 | Liem |
| 2012/0297383 A1 | 11/2012 | Meisner et al. |
| 2012/0311144 A1 | 12/2012 | Akelbein et al. |
| 2012/0311575 A1 | 12/2012 | Song |
| 2012/0324069 A1* | 12/2012 | Nori ........................ G06F 9/5066 709/222 |
| 2012/0324567 A1 | 12/2012 | Couto et al. |
| 2013/0019277 A1 | 1/2013 | Chang et al. |
| 2013/0054536 A1 | 2/2013 | Sengupta |
| 2013/0081142 A1 | 3/2013 | McDougal et al. |
| 2013/0086399 A1 | 4/2013 | Tychon et al. |
| 2013/0097138 A1 | 4/2013 | Barkol et al. |
| 2013/0097692 A1 | 4/2013 | Cooper et al. |
| 2013/0145465 A1 | 6/2013 | Wang et al. |
| 2013/0151680 A1 | 6/2013 | Salinas et al. |
| 2013/0166490 A1* | 6/2013 | Elkins ....................... G06N 5/02 706/47 |
| 2013/0166681 A1* | 6/2013 | Thompson ............... H04L 67/02 709/217 |
| 2013/0166720 A1 | 6/2013 | Takashima et al. |
| 2013/0198799 A1 | 8/2013 | Staggs et al. |
| 2013/0198840 A1* | 8/2013 | Drissi ....................... G06F 21/55 726/22 |
| 2013/0219384 A1 | 8/2013 | Srinivasan et al. |
| 2013/0223226 A1 | 8/2013 | Narayanan et al. |
| 2013/0250956 A1 | 9/2013 | Sun et al. |
| 2013/0263125 A1 | 10/2013 | Shamsee et al. |
| 2013/0275592 A1 | 10/2013 | Xu et al. |
| 2013/0276035 A1 | 10/2013 | Walker et al. |
| 2013/0276092 A1 | 10/2013 | Sun et al. |
| 2013/0283336 A1 | 10/2013 | Macy et al. |
| 2013/0291088 A1 | 10/2013 | Shieh et al. |
| 2013/0298181 A1 | 11/2013 | Smith et al. |
| 2013/0298184 A1 | 11/2013 | Ermagan et al. |
| 2013/0298243 A1* | 11/2013 | Kumar ................. H04L 63/1408 726/25 |
| 2013/0318617 A1 | 11/2013 | Chaturvedi et al. |
| 2013/0343396 A1 | 12/2013 | Yamashita et al. |
| 2014/0007181 A1 | 1/2014 | Sarin et al. |
| 2014/0022894 A1 | 1/2014 | Oikawa et al. |
| 2014/0033267 A1 | 1/2014 | Aciicmez |
| 2014/0096229 A1 | 4/2014 | Burns et al. |
| 2014/0099623 A1 | 4/2014 | Amit et al. |
| 2014/0137240 A1 | 5/2014 | Smith et al. |
| 2014/0153577 A1 | 6/2014 | Janakiraman et al. |
| 2014/0157352 A1 | 6/2014 | Paek et al. |
| 2014/0250524 A1 | 9/2014 | Meyers et al. |
| 2014/0282027 A1 | 9/2014 | Gao et al. |
| 2014/0282518 A1 | 9/2014 | Banerjee |
| 2014/0283030 A1 | 9/2014 | Moore et al. |
| 2014/0310765 A1 | 10/2014 | Stuntebeck et al. |
| 2014/0337743 A1 | 11/2014 | Branton |
| 2014/0344435 A1 | 11/2014 | Mortimore, Jr. et al. |
| 2015/0047046 A1 | 2/2015 | Pavlyushchik |
| 2015/0058983 A1 | 2/2015 | Zeitlin et al. |
| 2015/0082417 A1 | 3/2015 | Bhagwat et al. |
| 2015/0124606 A1 | 5/2015 | Alvarez et al. |
| 2015/0163088 A1 | 6/2015 | Anschutz |
| 2015/0180894 A1 | 6/2015 | Sadovsky et al. |
| 2015/0180949 A1* | 6/2015 | Maes ....................... G06F 9/5072 709/201 |
| 2015/0229641 A1 | 8/2015 | Sun et al. |
| 2015/0235229 A1 | 8/2015 | Pryor |
| 2015/0249676 A1 | 9/2015 | Koyanagi et al. |
| 2015/0269383 A1* | 9/2015 | Lang ....................... G06F 21/57 726/1 |
| 2015/0295943 A1 | 10/2015 | Malachi |
| 2016/0028851 A1 | 1/2016 | Shieh |
| 2016/0072899 A1* | 3/2016 | Tung ...................... H04L 41/145 709/223 |
| 2016/0105370 A1* | 4/2016 | Mellor ..................... G06Q 10/00 709/226 |
| 2016/0162179 A1 | 6/2016 | Annett et al. |
| 2016/0171682 A1* | 6/2016 | Abedini ................... G16H 30/20 382/132 |

(56) References Cited

U.S. PATENT DOCUMENTS

| | | |
|---|---|---|
| 2016/0173521 A1 | 6/2016 | Yampolskiy et al. |
| 2016/0191466 A1 | 6/2016 | Pernicha |
| 2016/0191545 A1 | 6/2016 | Nanda et al. |
| 2016/0203331 A1 | 7/2016 | Khan et al. |
| 2016/0234250 A1 | 8/2016 | Ashley et al. |
| 2016/0269442 A1 | 9/2016 | Shieh |
| 2016/0294774 A1 | 10/2016 | Woolward et al. |
| 2016/0294875 A1 | 10/2016 | Lian et al. |
| 2016/0301704 A1* | 10/2016 | Hassanzadeh ...... H04L 63/0209 |
| 2016/0323245 A1 | 11/2016 | Shieh et al. |
| 2016/0337390 A1 | 11/2016 | Sridhara et al. |
| 2016/0350105 A1 | 12/2016 | Kumar et al. |
| 2016/0357424 A1 | 12/2016 | Pang et al. |
| 2016/0357774 A1 | 12/2016 | Gauchi et al. |
| 2017/0005986 A1 | 1/2017 | Bansal et al. |
| 2017/0006135 A1* | 1/2017 | Siebel .................... G06Q 10/06 |
| 2017/0063795 A1 | 3/2017 | Lian et al. |
| 2017/0075744 A1* | 3/2017 | Deshpande ......... H04L 41/0631 |
| 2017/0085654 A1 | 3/2017 | Mikhailov et al. |
| 2017/0118218 A1 | 4/2017 | Koottayi |
| 2017/0134422 A1 | 5/2017 | Shieh et al. |
| 2017/0168864 A1 | 6/2017 | Ross et al. |
| 2017/0180421 A1 | 6/2017 | Shieh et al. |
| 2017/0195454 A1 | 7/2017 | Shieh |
| 2017/0208100 A1 | 7/2017 | Lian et al. |
| 2017/0223033 A1 | 8/2017 | Wager et al. |
| 2017/0223038 A1 | 8/2017 | Wager et al. |
| 2017/0251013 A1 | 8/2017 | Kirti |
| 2017/0264619 A1* | 9/2017 | Narayanaswamy .... H04L 63/20 |
| 2017/0264640 A1* | 9/2017 | Narayanaswamy ........................ H04L 63/0281 |
| 2017/0279770 A1 | 9/2017 | Woolward |
| 2017/0295188 A1* | 10/2017 | David .................... G06F 21/125 |
| 2017/0302685 A1 | 10/2017 | Ladnai et al. |
| 2017/0339188 A1 | 11/2017 | Jain et al. |
| 2017/0374032 A1 | 12/2017 | Woolward et al. |
| 2017/0374101 A1 | 12/2017 | Woolward |
| 2018/0005296 A1 | 1/2018 | Eades et al. |
| 2018/0083977 A1 | 3/2018 | Murugesan et al. |
| 2018/0095976 A1 | 4/2018 | Shelksohn |
| 2018/0113773 A1* | 4/2018 | Krishnan ............... G06N 5/022 |
| 2018/0137506 A1* | 5/2018 | Kcl ....................... G06Q 20/401 |
| 2018/0191779 A1 | 7/2018 | Shieh et al. |
| 2018/0225795 A1* | 8/2018 | Napoli ............. G06Q 10/06316 |
| 2018/0232262 A1 | 8/2018 | Chowdhury et al. |
| 2018/0234385 A1* | 8/2018 | O'Neil .................... H04L 63/20 |
| 2018/0270127 A1 | 9/2018 | Pang et al. |
| 2018/0375877 A1* | 12/2018 | Jakobsson ............. G06F 16/955 |
| 2019/0014153 A1* | 1/2019 | Lang ....................... G06F 21/57 |
| 2019/0043534 A1 | 2/2019 | Sievert |
| 2019/0052549 A1 | 2/2019 | Duggal et al. |
| 2019/0081963 A1 | 3/2019 | Waghorn |
| 2019/0109820 A1* | 4/2019 | Clark .................. H04L 63/0227 |
| 2019/0141075 A1 | 5/2019 | Gay |
| 2019/0273746 A1 | 9/2019 | Coffing |
| 2019/0278760 A1 | 9/2019 | Smart |
| 2019/0317728 A1 | 10/2019 | Chen et al. |
| 2019/0342307 A1 | 11/2019 | Gamble et al. |
| 2019/0394225 A1 | 12/2019 | Vajipayajula et al. |
| 2020/0043008 A1 | 2/2020 | Hrabik |
| 2020/0065343 A1 | 2/2020 | Morkovine |
| 2020/0074078 A1 | 3/2020 | Saxe et al. |
| 2020/0076826 A1 | 3/2020 | Ford |
| 2020/0145441 A1 | 5/2020 | Patterson et al. |
| 2020/0169565 A1 | 5/2020 | Badawy et al. |
| 2020/0259852 A1 | 8/2020 | Wolff |
| 2020/0382363 A1 | 12/2020 | Woolward et al. |
| 2020/0382556 A1 | 12/2020 | Woolward et al. |
| 2020/0382557 A1 | 12/2020 | Woolward et al. |
| 2020/0382560 A1 | 12/2020 | Woolward et al. |
| 2020/0382586 A1 | 12/2020 | Badawy et al. |
| 2021/0120029 A1 | 4/2021 | Ross et al. |
| 2021/0126837 A1* | 4/2021 | Dinh ................... H04L 67/1097 |
| 2021/0168150 A1* | 6/2021 | Ross .................... G06F 16/9024 |
| 2022/0036302 A1* | 2/2022 | Cella .................. G06Q 10/0834 |
| 2022/0201025 A1 | 6/2022 | Ross et al. |
| 2022/0245256 A1 | 8/2022 | Wang et al. |
| 2022/0247774 A1 | 8/2022 | Bigbee et al. |
| 2022/0311460 A1 | 9/2022 | Azin et al. |

FOREIGN PATENT DOCUMENTS

| | | | |
|---|---|---|---|
| TW | | 201642618 A | 12/2016 |
| TW | | 201703483 A | 1/2017 |
| TW | | 201703485 A | 1/2017 |
| WO | WO2002098100 | A1 | 12/2002 |
| WO | WO2016148865 | A1 | 9/2016 |
| WO | WO2016160523 | A1 | 10/2016 |
| WO | WO2016160533 | A1 | 10/2016 |
| WO | WO2016160595 | A1 | 10/2016 |
| WO | WO2016160599 | A1 | 10/2016 |
| WO | WO2017100365 | A1 | 6/2017 |

OTHER PUBLICATIONS

Fazio, et al.; Message Oriented Middleware for Cloud Computing to Improve Efficiency in Risk Management Systems; http://www.scpe.org (Year: 2013).*

Souto, et al.; A Message-Oriented Middleware for Sensor Networks; 2nd International Workshop on Middleware for Pervasive and Ad-Hoc Computing, Oct. 18-22, 2004, Toronto, Ontario, Canada. (Year: 2004).*

Wun et al.; Policy Management Framework for Content-Based Publish/Subscribe Middleware; IFIP International Federation for Information Processing 2007 (Year: 2007).*

Russello et al.; A policy-based publish/subscribe middleware for sense-and-react applications; A policy-based publish/subscribe middleware for sense-and-react applications (Year: 2009).*

Casola et al.; A security monitoring system for internet of things; www.elsevier.com/locate/iot (Year: 2019).*

Pierleoni et al.; Amazon, Google and Microsoft Solutions for IoT: Architectures and a Performance Comparison; IEEE (Year: 2019).*

Vinoski; An Overview of Middleware; http://www.iona.com/hyplan/vinoski/ (Year: 2004).*

Wang et al.; Anomaly Detection in the Case of Message Oriented Middleware; ACM (Year: 2008).*

Carranza et al.; Brokering Policies and Execution Monitors for IoT Middleware; SACMAT '19, Jun. 3-6, 2019, Toronto, ON, Canada (Year: 2019).*

Albano et al.; Message-oriented middleware for smart grids; www.elsevier.com/locate/csi (Year: 2013).*

Mahmoud; Middleware for Communications; Middleware for Communications; John Wiley & Sons Ltd, The Atrium, Southern Gate, Chichester, West Sussex PO19 8SQ, England (Year: 2004).*

Chew; Modelling Message-Oriented-Middleware Brokers using Autoregressive Models for Bottleneck Prediction; PhD Thesis at School of Electronic Engineering and Computer Science Queen Mary University of London; scholar/google.com; ZB Chew—2013—core.ac.uk (Year: 2013).*

"International Search Report" and "Written Opinion of the International Searching Authority," Patent Cooperation Treaty Application No. PCT/US2016/024116, dated May 3, 2016, 12 pages.

"International Search Report" and "Written Opinion of the International Searching Authority," Patent Cooperation Treaty Application No. PCT/US2016/024300, dated May 3, 2016, 9 pages.

"International Search Report" and "Written Opinion of the International Searching Authority," Patent Cooperation Treaty Application No. PCT/US2016/024053, dated May 3, 2016, 12 pages.

"International Search Report" and "Written Opinion of the International Searching Authority," Patent Cooperation Treaty Application No. PCT/US2016/019643, dated May 6, 2016, 27 pages.

Dubrawsky, Ido, "Firewall Evolution—Deep Packet Inspection," Symantec, Created Jul. 28, 2003; Updated Nov. 2, 2010, symantec.com/connect/articles/firewall-evolution-deep-packet-inspection, 3 pages.

"International Search Report" and "Written Opinion of the International Searching Authority," Patent Cooperation Treaty Application No. PCT/US2016/024310, dated Jun. 20, 2016, 9 pages.

(56) References Cited

OTHER PUBLICATIONS

"Feature Handbook: NetBrain® Enterprise Edition 6.1" NetBrain Technologies, Inc., Feb. 25, 2016, 48 pages.
Arendt, Dustin L. et al., "Ocelot: User-Centered Design of a Decision Support Visualization for Network Quarantine", IEEE Symposium on Visualization for Cyber Security (VIZSEC), Oct. 25, 2015, 8 pages.
"International Search Report" and "Written Opinion of the International Searching Authority," Patent Cooperation Treaty Application No. PCT/US2016/065451, dated Jan. 12, 2017, 20 pages.
Maniar, Neeta, "Centralized Tracking and Risk Analysis of 3rd Party Firewall Connections," SANS Institute InfoSec Reading Room, Mar. 11, 2005, 20 pages.
Hu, Hongxin et al., "Detecting and Resolving Firewall Policy Anomalies," IEEE Transactions on Dependable and Secure Computing, vol. 9, No. 3, May/Jun. 2012, pp. 318-331.
Woolward et al., "Template-Driven Intent-Based Security," U.S. Appl. No. 16/428,838, filed May 31, 2019, Specification, Claims, Abstract, and Drawings, 60pages.
Woolward et al., "Validation of Cloud Security Policies," U.S. Appl. No. 16/428,849, filed May 31, 2019, Specification, Claims, Abstract, and Drawings, 54 pages.
Woolward et al., "Reliability Prediction for Cloud Security Policies," U.S. Appl. No. 16/428,858, filed May 31, 2019, Specification, Claims, Abstract, and Drawings, 59 pages.
Bates, Adam Macneil, "Designing and Leveraging Trustworthy Provenance-Aware Architectures", ProQuest Dissertations and Theses ProQuest Dissertations Publishing, 2017, 147 pages.
Wang et al., "System and Method for Attributing User Behavior from Multiple Technical Telemetry Sources," U.S. Appl. No. 17/162,761, filed Jan. 29, 2021; Specification, Claims, Abstract, and Drawings, 31 pages.

\* cited by examiner

MODELING TOPIC-BASED MESSAGE-ORIENTED MIDDLEWARE WITHIN A SECURITY SYSTEM

TECHNICAL FIELD

The present disclosure relates generally to data processing and, more particularly, to systems and methods for modeling topic-based message-oriented middleware (MoM) within security and operational management systems.

BACKGROUND

Currently, there exist many different systems providing MoM within enterprise solutions. However, the existing MoM systems are not standardized and, therefore, are delivered and instrumented using varying approaches. The lack of standardization makes it difficult to monitor and ensure that proper security controls are in place when dealing with multiple MoM systems. It also makes operational and business continuity planning challenging as understanding end-to-end application dependencies through MoM systems is inconsistent and complex. Because the existing MoM systems are complex and their interfaces are not standardized, enterprise security teams do not readily have access to information. There is currently no reliable way of interfacing with different systems and making it simple and accessible for a security team or application developers to understand all of their use of MoM to facilitate security of these systems and understanding of application dependencies for operational purposes. These difficulties exist in private data centers, private and public computing clouds, and various combinations thereof.

Because all of the existing solutions are deployed above a networking layer, normal network monitoring tools and normal network security tools, such as security groups, virtual private cloud flow logs, monitoring telemetry, and so forth cannot be used. There is currently no interface or integration between all of these different systems, as well as no integration into a standardized model that would make it simple for an application developer to create data flow diagrams, such that they can review the usage, identify when the usage changes, and get alerted. Some existing systems operate on an open basis by default, whereas others do not. For open systems, a rogue actor could potentially join a topic and gain access to all of the messaging because all of the transport layer encryption is below the system. Thus, there is currently no system that would allow providing consistent sets of permissions to minimize the amount of access to ensure that only a specific system with access to a given topic gets the access.

Moreover, there are regulatory requirements for critical business functions to be reviewed on a periodic basis. Conventionally, data to be reviewed are generated manually or developers of the system make assumptions as to what the data mean and on the relationships between components of the system.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are systems and methods for modeling topic-based message-oriented middleware. According to one example embodiment, an enterprise security system for modeling topic-based message-oriented middleware may include a cloud connector, a graphical unit, and a policy compute engine. The cloud connector may be configured to connect with a MoM system and convert information associated with the MoM system into a standardized object model. The standardized object model may include a topic-based node associated with a topic of the MoM system, at least one producer application, and at least one consumer application. The at least one producer application may be configured to provide one or more messages to the topic-based node. The one or more messages may be related to the topic and be generated by one or more producers associated with the at least one producer application. The at least one consumer application may be configured to receive the one or more messages from the topic-based node. The one or more messages may be consumed by one or more consumers associated with the at least one consumer application. The graphical unit may be configured to generate a standardized graph of relationships between the one or more producers and the one or more consumers over a period of time. The standardized graph can be viewed or exported in a human readable report (e.g., a Portable Document Format (PDF) report) or a machine-readable report (e.g., a Comma-Separated Values (CSV) report or a JavaScript Object Notation (JSON) report). The policy compute engine may be configured to create a policy and periodically analyze the standardized graph for at least one deviation from the policy. In response to detecting the at least one deviation, the policy compute engine may issue an alert.

According to another example embodiment, a method for modeling topic-based message-oriented middleware is provided. The method may commence with connecting, by a cloud connector, with a MoM system. The method may include converting, by the cloud connector, information associated with the MoM system into a standardized object model. The standardized object model may include a topic-based node associated with a topic of the MoM system, at least one producer application, and at least one consumer application. The at least one producer application may provide one or more messages to the topic-based node. The one or more messages may be related to the topic and be generated by one or more producers associated with the at least one producer application. The at least one consumer application may receive the one or more messages from the topic-based node. The one or more messages may be consumed by one or more consumers associated with the at least one consumer application. The method may continue with generating, by a graphical unit, a standardized graph of relationships between the one or more producers and the one or more consumers over a period of time. The method may further include creating a policy by a policy compute engine. The policy compute engine may periodically analyze the standardized graph for at least one deviation from the policy. The method may further include issuing an alert by the policy compute engine in response to detecting the at least one deviation.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

The present disclosure provides methods and systems for modeling topic-based message-oriented middleware. The proposed systems provide a way of interfacing with different applications/platforms that communicate with each other and facilitating access for a security team or some application developers to better understand their use of a topic-based message-oriented middleware to simplify providing security for those applications/platforms and to understand application dependencies.

The systems of the present disclosure can interface with different applications, integrate information into a standardized model, and facilitate creation of data flow diagrams such that any unexpected usage changes can be detected, and alerts issued. Furthermore, the systems of the present disclosure allow creating sets of permissions to minimize the amount of access, thereby ensuring that only certain systems are provided with access to a message topic.

The systems and methods disclosed herein can use an enterprise security system defined as the application controller (also referred herein to as a controller) to create a standardized model in a graph in order to describe how topic-based message-oriented middleware works.

Figure 1:
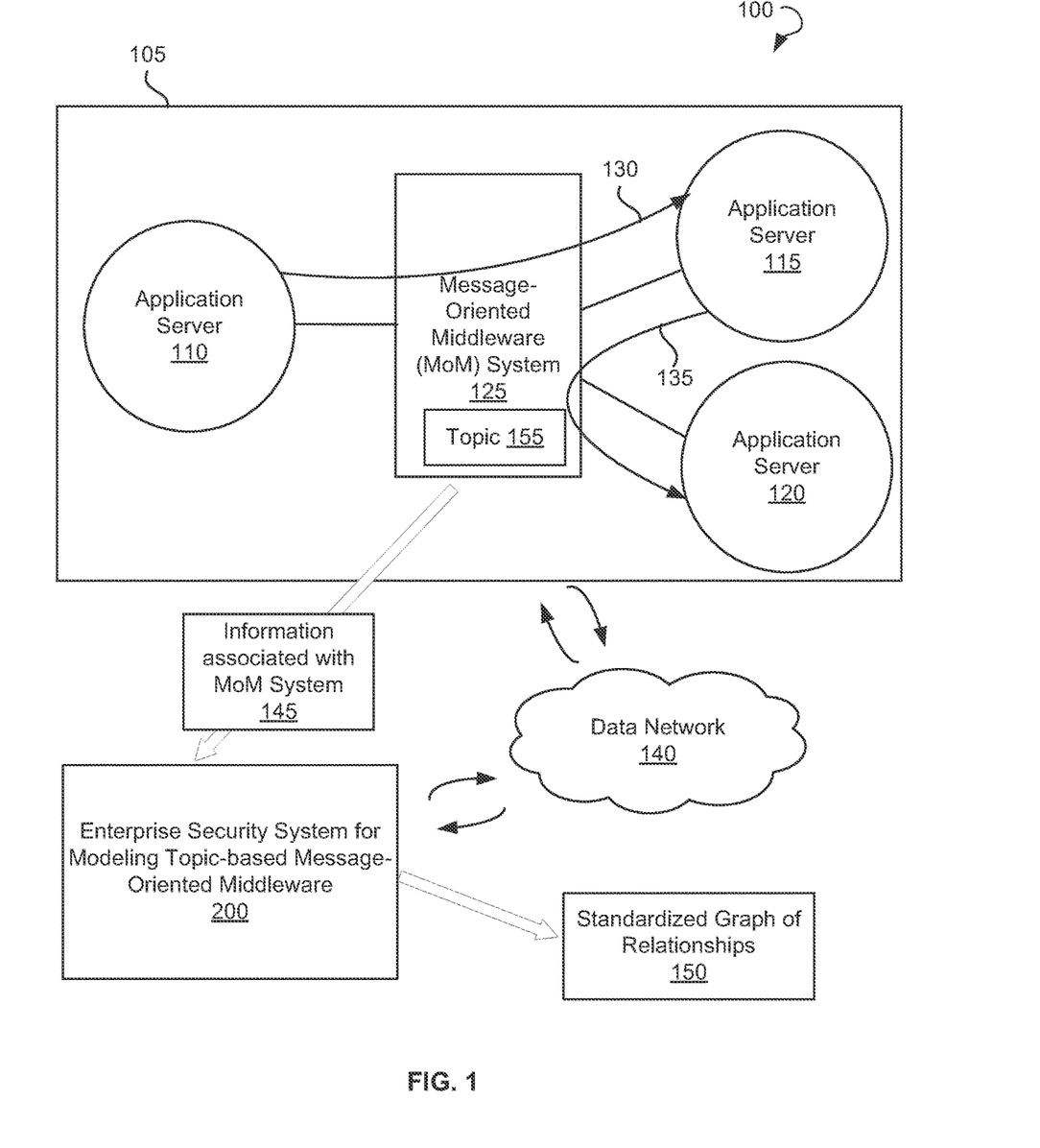
FIG. 1 is a block diagram of an environment, in which systems and methods for modeling topic-based message-oriented middleware can be implemented, according to some example embodiments.

Referring now to the drawings, FIG. 1 is a block diagram of environment 100, in which systems and methods for modeling topic-based message-oriented middleware can be implemented, according to some example embodiments. The environment 100 may include an enterprise network 105 and an enterprise security system 200 (referred herein to as a system 200) for modeling topic-based message-oriented middleware. The enterprise network 105 may be associated with an enterprise (not shown) and may have a plurality of distributed systems shown as application servers 110, 115, and 120, which may communicate with each other. The distributed systems may include applications, Enterprise JavaBeans, servlets, and other components and may run on different networked platforms. A MoM system 125 may be provided in the enterprise network 105 to support the interactions between the application servers 110, 115, and 120 by providing a Publish/Subscribe communications channel known commonly as an Enterprise Message Bus.

The MoM system 125 is software or hardware infrastructure that supports sending and receiving messages between distributed systems. Data producers (also called publishers) may not send data directly to a destination service but may put the data onto a distributed broker or an Enterprise Message Bus (such as the MoM system 125) where the data wait until data consumers retrieve the data. Therefore, application modules, such as application servers 110, 115, and 120, may be distributed over heterogeneous platforms and may communicate with each other via the MoM system 125. For example, the application server 110 may communicate with the application server 115 and the application server 115 may communicate with the application server 120 via the MoM system 125. Specifically, the MoM system 125 may act as a message broker between the application servers 110, 115, and 120 and may receive messages from one server and send the messages to and/or store the messages for other servers. For example, the MoM system 125 may serve communications 130 sent between the application server 110 and the application server 115 and communications 135 sent between the application server 115 and the application server 120.

The MoM system 125 creates a distributed communications layer that insulates an application developer from information related to various operating systems and network interfaces associated with the application servers 110, 115, and 120. The MoM system 125 may have an API that can be used by the application servers 110, 115, and 120 distributed on different network nodes to communicate. Software elements of the MoM system 125 may reside in all communicating components of the enterprise network 105 and may typically support asynchronous calls between client and server applications.

As can be seen in FIG. 1, from a networking perspective, the application server 110 communicates with the MoM system 125 and then the MoM system 125 communicates with the application server 115; and the application server 115 communicates with the MoM system 125 and then the MoM system 125 communicates with the application server 120. Meanwhile, from a perspective of relationships between the application servers, the application server 110 is actually communicating with the application server 115 by sending communications 130, and the application server 115 is actually communicating with the application server 120 by sending communications 135.

The communications produced (or published) by one application server (acting as producer of messages) and consumed (or read) by other application servers (acting as consumers of messages) may relate to one or more specific topics. The MoM system 125 may support one or more topics 155 and, optionally, store messages related to specific topics to corresponding topics 155. The one or more topics 155 may include a human-readable name that relates to a business function. In the topic-based approach, a message is published out by any of producers and can be read by many consumers. Therefore, multiple producers and multiple subscribers exist in the topic-based approach.

To provide a full end-to-end application visibility of the enterprise network 105, the enterprise security system 200 for modeling topic-based message-oriented middleware is provided and connected to the MoM system 125. In an example embodiment, the system 200 may communicate with the MoM system 125 via a data network 140.

The data network 140 may include the Internet or any other network capable of communicating data between devices. Suitable networks may include or interface with any one or more of, for instance, a local intranet, a corporate data network, a data center network, a home data network, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network 140 can further include or interface with any one or more of a Recommended Standard 232 (RS-232) serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking.

The system 200 may receive information 145 associated with the MoM system 125, process the collected information 145, and generate a standardized graph 150 of relationships between the distributed systems, such as application servers 110, 115, and 120 over a period of time. The standardized graph 150 can be viewed or exported in a human readable report (e.g., a PDF report) or a machine-readable report (e.g., a CSV report or a JSON report).

Figure 2:
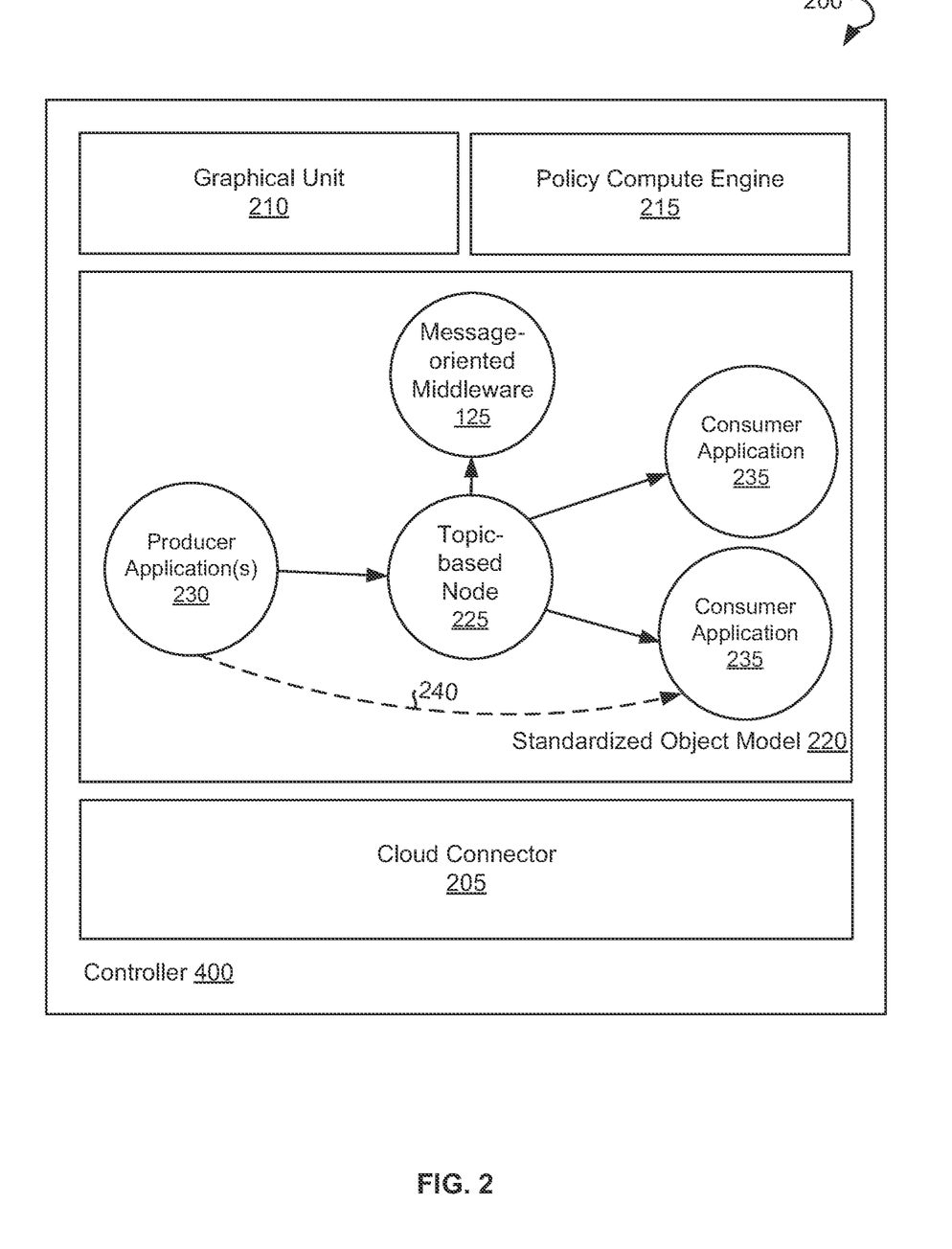
FIG. 2 shows an enterprise security system for modeling topic-based message-oriented middleware, according to an example embodiment.

FIG. 2 shows an enterprise security system 200 for modeling topic-based message-oriented middleware. In an example embodiment, the system 200 may act as an application controller, shown as a controller 400. The system 200 may include a cloud connector 205, a graphical unit 210, and a policy compute engine 215. The cloud connector 205 may be configured to connect with a MoM system, such as the MoM system 125 shown in FIG. 1. The MoM system may be associated with a private data center, a private cloud, a public cloud, and so forth. Example MoM systems include Apache Kafka, IBM MQ, RabbitMQ, TIBCO Rendezvous, AWS Kinesis, Microsoft Azure Service Bus, Microsoft Message Queuing (MSMQ), NServiceBus, Simple Queue Service (SQS), Simple Notification Service (SNS), Advanced Message Processing System (AMPS), one or more systems designed for relaying, routing, and/or transforming messages, and so forth.

The cloud connector 205 may be configured to receive information associated with the MoM system and convert the received information into a standardized object model 220. In an example embodiment, the information received from the MoM system by the cloud connector 205 may include a telemetry feed with events of the MoM system (e.g., IBM MQ accounting). In this embodiment, the cloud connector 205 may consume a stream of the telemetry feed (e.g., process and directional metadata), convert the events into relationships, and summarize the relationships. If, for example, there are thousands of producer applications 230 producing messages on a topic associated with the topic-based node 225 and one of consumer applications 235 is consuming these messages, the cloud connector 205 may summarize the information related to messages to only one entry stating that the producer applications 230 produced N messages (where N is the number of messages) on the topic consumed by one of the consumer applications 235. Therefore, the information associated with the MoM system received by the cloud connector 205 may be compressed when converting the information into the standardized object model 220.

In a further example embodiment, the MoM system may not support the telemetry streaming (e.g., Kafka). In this embodiment, the information received from the MoM system by the cloud connector 205 may include a data snapshot of requests from the MoM system. The cloud connector 205 may periodically request the data snapshot of requests or receive the data snapshots directly from the MoM system through logs and/or accounting information, determine status information based on the data snapshot, and convert the status information into the standardized object model.

The standardized object model 220 may include a node associated with the MoM system 125 and a topic-based node 225 associated with a topic of the MoM system 125. The standardized object model 220 may further include nodes associated with one or more producer applications 230 and nodes associated with one or more consumer applications 235. The producer applications 230 may be configured to provide one or more messages to the topic-based node 225. The one or more messages may be related to the topic and may be generated by one or more producers associated with the producer applications 230. The consumer applications 235 may be configured to receive the one or more messages from the topic-based node 225. The one or more messages may be consumed by one or more consumers associated with the consumer applications 235.

The graphical unit 210 may use the standardized object model 220 to generate a standardized graph of relationships 240 between the one or more producers and the one or more consumers over a period of time. The standardized graph may visualize the information collected by the cloud connector 205 for network operators to facilitate understanding of configuration types and specific parameters of a data network.

For example, the standardized graph may show relationships between an application sending messages and an application receiving the messages. The standardized graph may also consolidate communications related to the topic across the MoM system 125, Transmission Control Protocol/Internet Protocol (TCP/IP) communications, and other communications.

When the system 200 puts the information into the standardized graph, the system 200 can record one instance of each relationship at a time over a period of time (e.g., months) for the producer applications 230 producing messages for the topic. Thus, the standardized graph may show which producer application 230 produced massages on a topic, when a first message was produced by the producer application 230, when a last message was produced by the producer application 230, the number of messages the producer application 230 produced, the volume of messages the producer application 230 produced, and so forth.

The policy compute engine 215 may be configured to create a policy. The policy may be created by the policy compute engine 215 based on the one or more producers, the one or more consumers, and the topic. For example, the policy may set a normal behavior of a system. The policy compute engine 215 may periodically analyze the standardized graph for at least one deviation from the policy. The policy compute engine 215 may compare new behavior of producers and consumers against the policy and create an event if a deviation from the policy is detected.

In an example embodiment, the at least one deviation may be indicative of an operational risk or a cyber risk. The at least one deviation may be determined based on at least one of the following events: an unexpected change in usage, appearance of a new node, an unexpected change in a node, a new relationship between nodes (e.g., when instead of consumer applications 1 and 2, consumer application 3 appears and starts consuming messages generated by a producer application), a threshold of communications exceeded, events occurring at a different time, a higher Service Level Agreement (SLA) requirement, a Recovery Time Objective (RTO) mismatch between nodes, a Recovery Point Objective (RPO) mismatch between nodes, and so forth.

The analysis of the standardized graph may be based on one or more of the following: baselined historical data, a set of predetermined permissions, regulatory requirements, and so forth. For example, the events that deviate from the policy may include exceeding threshold of communication volume, events happening at different time of day than expected, appearance of a new producer application or a new consumer application, and so forth.

In an example embodiment, the events that deviate from the policy may include an event when a new producer application or consumer application becomes dependent on the topic (which means joining the topic by a new member and indicating that the new member is producing or retrieving data from an enterprise system). In this embodiment, a business impact analysis may need to be performed. The standardized graph can include the SLA, RTOs and RPOs, and operational information associated with consumer applications and producer applications. A new consumer application can have a higher SLA requirement than the SLA associated with the producer application.

The RTO for critical functions can be asserted across complex business interdependencies to meet regulatory obligations. The RTO is an amount of time it takes for an application to go from a down state to an active state. The RPO is a period of time in which an enterprise system must be restored after a disruptive event. The RTOs and RPOs can be used in operational risk assessments to determine whether a producer application 1 is appropriate to provide service to a consumer application 1. For example, the producer application 1 can have an RTO of 4 and the consumer application 1 can have an RTO of 1, which means that the producer application 1 is inappropriate to provide service to the consumer application 1. Therefore, dynamic, continuous, transparent, and consistent visibility of applications and dependencies and relationships across the MoM system can be used to reduce the operational risk. Responding immediately to changes in interdependencies of critical functions and their recovery time capabilities can be used to improve customer experience.

In response to detecting the at least one deviation, the policy compute engine 215 may issue an alert. The alert can be sent to a security team to trigger security investigation. The policy compute engine 215 may be further configured to take a mitigating action in response to the alert. For example, the policy can be written to issue the alert if the RTO of the consumer application 1 is higher than the RTO of the producer application 1 to detect that there is an operational risk. The policy compute engine 215 may be further configured to create a report showing relationships between the producer application and the consumer application of the MoM system.

In an example embodiment, the policy compute engine 215 may use the standardized graph to generate data flow diagrams and infrastructure dependencies associated with the MoM system. Data flow diagrams can show relationships between producer applications and consumer applications. Using the data flow diagrams, a data flow diagram report can be produced for the whole enterprise system. The data flow diagram report can be used to satisfy regulatory requirements for critical business functions to be reviewed on a periodic basis. In view of this, the policy compute engine 215 may be further configured to periodically review critical business functions visualized in the standardized graph.

The policy compute engine 215 may be further configured to set permissions to control access to the topic. Based on the permissions, the MoM system can determine which producer application is allowed to produce (publish) and which consumer application is allowed to consume (subscribe on) a topic based on processes running on machines associated with the producer application and the consumer application. In some embodiments, the determination of whether the application is allowed to access is performed based on certificates, public key infrastructure, a username, a password, and so forth. The permissions allow preventing an authorized producer application from spoofing data and preventing an authorized consumer from illegitimately subscribing to a specific topic and accessing the data.

In some embodiments, a clustering machine learning module may be built based on the standardized graph to monitor the MoM system for behavior anomalies.

Figure 3:
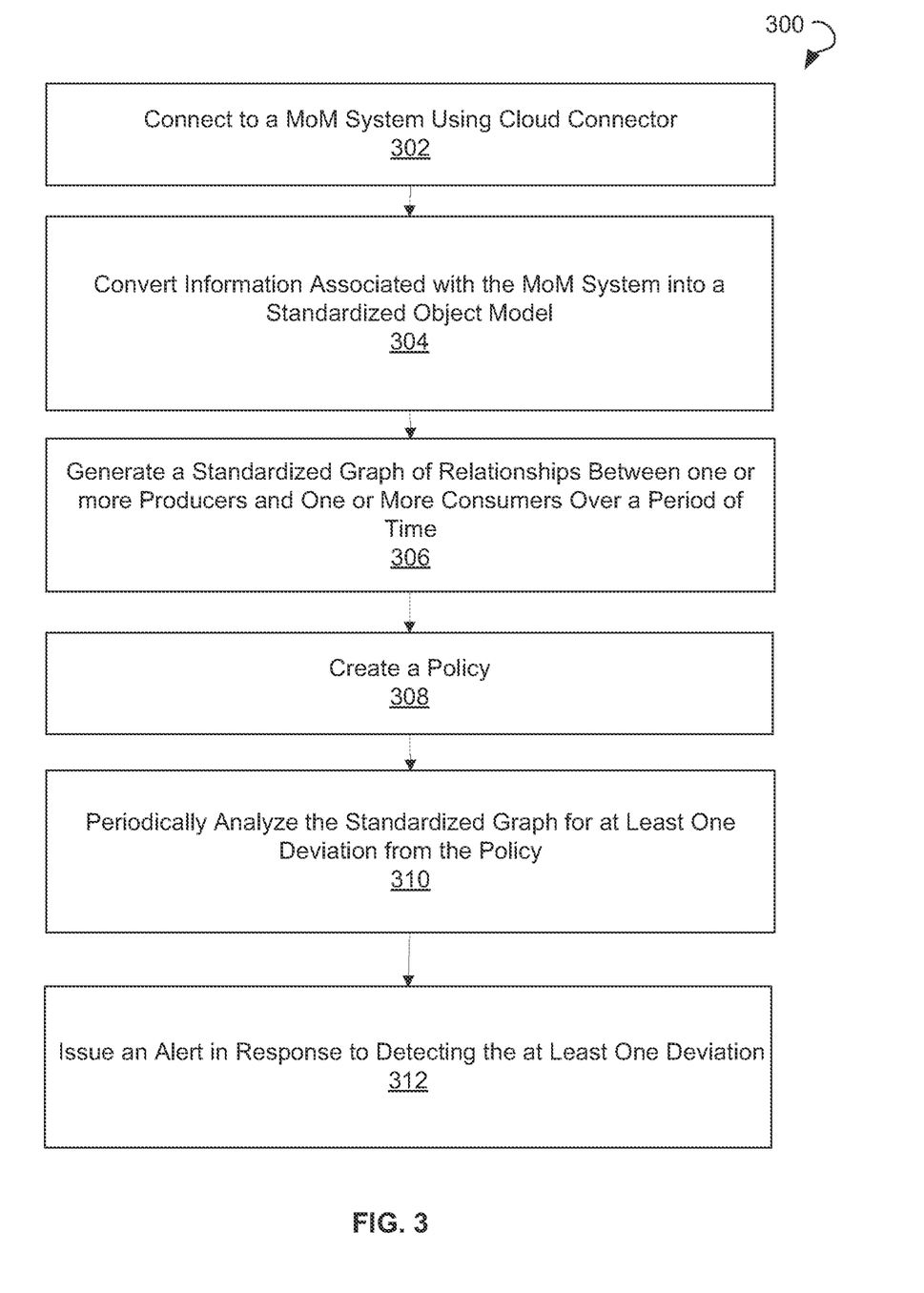
FIG. 3 is a flow chart of an example method for modeling topic-based message-oriented middleware, according to some example embodiments.

FIG. 3 is a flow chart of example method 300 for modeling topic-based message-oriented middleware, according to some example embodiments. The method 300 may commence with connecting, by a cloud connector, with a MoM system at operation 302. The method 300 may include converting, by the cloud connector, information associated with the MoM system into a standardized object model at operation 304. The cloud connector may receive the information from the MoM system.

The standardized object model may include a topic-based node associated with a topic of the MoM system, at least one producer application, and at least one consumer application. The producer application may provide one or more messages to the topic-based node. The one or more messages may be related to the topic and may be generated by one or more producers associated with the producer application. The at least one consumer application may receive the one or more messages from the topic-based node. The one or more messages may be consumed by one or more consumers associated with the at least one consumer application.

The method 300 may continue with generating, by a graphical unit, a standardized graph of relationships between the one or more producers and the one or more consumers over a period of time at operation 306. The method 300 may further include creating, by a policy compute engine, a policy at operation 308. The policy compute engine may periodically analyze the standardized graph for at least one deviation from the policy at operation 310. The method 300 may further include operation 312, at which the policy compute engine may issue an alert in response to detecting the at least one deviation. The method 300 may further include creating, by the policy compute engine, a report showing relationships between the at least one producer application and the at least one consumer application of the MoM system.

In some embodiments, the policy compute engine may also set permissions to control access to the topic and periodically analyze the standardized graph to determine whether any unauthorized producer and consumer attempts to access the topic. In an example embodiment, the method 300 may further include generating data flow diagrams and infrastructure dependencies associated with the MoM system based on the standardized graph.

In an example embodiment, the information received from the MoM system includes at least a telemetry feed with events of the MoM system. The method 300 may include converting the events into relationships and summarizing the relationships by the cloud connector.

Figure 4:
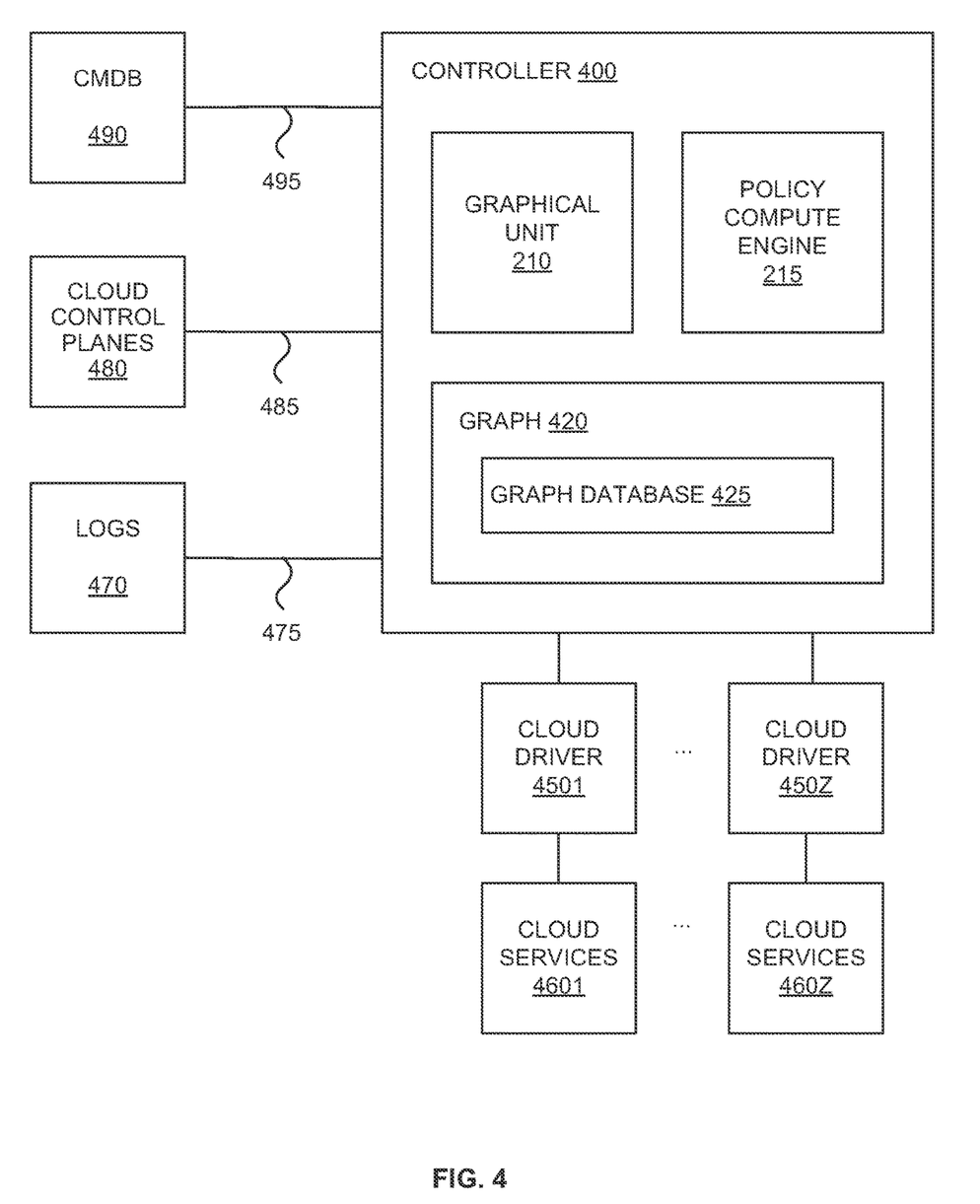
FIG. 4 shows a controller implemented in an enterprise security system for modeling topic-based message-oriented middleware, according to an example embodiment.

FIG. 4 shows a controller 400, according to an example embodiment. In some embodiments, the controller 400 may be implemented in the form of an enterprise security system 200 for modeling topic-based message-oriented middleware shown in FIG. 2.

The controller 400 can receive streaming telemetry 475 from network logs 470, events 485 from cloud control plane 480, and inventory 495 from configuration management database (CMDB) 490.

Network logs 470 can be data sources such as flow logs from cloud services 4601-460Z (e.g., Amazon Web Services (AWS), Microsoft Azure, and Google Cloud Platform (GCP)), vArmour DSS Distributed Security System, Software Defined Networking (SDN) (e.g., VMware NSX and Cisco Application Centric Infrastructure (ACI)), monitoring agents (e.g., Tanium Asset and Falco), and the like. Generally, streaming telemetry 475 can be low-level data about relationships between applications. Streaming telemetry 475 can include 5-tuple, layer 7 (application layer) process information, management plane logs, and the like. 5-tuple refers to a set of five different values that comprise a TCP/IP connection: a source IP address/port number, destination IP address/port number and the protocol in use. Streaming telemetry 475 can alternatively or additionally include a volume of data (i.e., how much data there is or how many data packets there are) exchanged between workloads (e.g., a physical computing system, a virtual machine, a container, and combinations thereof) in a network, dates and times at which communications (e.g., data packets) are exchanged between workloads, and the like.

Cloud control plane 480 establishes and controls the network and computing resources within a cloud computing environment (e.g., environment 100 in FIG. 1). Cloud control plane 480 can include interfaces for managing assets (e.g., launching virtual machines and/or containers, configuring the network, etc.) in a cloud computing environment. For example, cloud control plane 480 can include one or more instances of container orchestration, such as Docker Swarm®, Kubernetes®, Amazon EC2 Container Service (ECS), Diego, and Apache® Mesos™. By way of further non-limiting examples, cloud control plane 480 can include VMware vSphere, application programming interfaces (APIs) provided by cloud services 4601-460Z, and the like.

Events 485 can include information about a container being created, having a state change, having an error, and the like. For example, when a container is created, information about the workload such as a service name, image deployed, and the like can be received in events 485. By way of further example, additional information from an image registry corresponding to the deployed image can be gathered by controller 400.

The CMDB 490 can be a database of information about the hardware and software components (also known as assets) used in a cloud computing environment (e.g., environment 100 in FIG. 1) and relationships between those components and business functions. CMDB 490 can include information about upstream sources or dependencies of components, and the downstream targets of components. For example, inventory 495 can be used to associate an application name and other information (e.g., regulatory requirements, business unit ownership, business criticality, and the like) with the workload it is running on.

Streaming telemetry 475, events 485, and inventory 495 can be ingested by graph 420. Graph 420 normalizes information received in streaming telemetry 475, events 485, and inventory 495 into a standard data format and/or model stored in a graph database 425. Graph database 425 uses a graph data model comprised of nodes (also referred to as vertices), which is an entity such as a workload, and edges, which represent the relationship between two nodes. Edges can be referred to as relationships. An edge can have a start node, end node, type, and direction, and an edge can describe parent-child relationships, actions, ownership, and the like. In contrast to relational databases, relationships are (most) important in graph database 425. In other words, connected data is equally (or more) important than individual data points.

Conventionally, security management systems store raw logs of each and every individual communication between workloads. The amount of data is scaled linearly and consumes massive amounts of storage. In contrast, streaming telemetry 475, events 485, and inventory 495 can be used by graph 420 to create and update graph database 425. The individual communications may be not stored. In this way, graph database 425 is advantageously scalable. For example, graph database 425 for a large cloud computing environments of 30,000-50,000 workloads can be stored in memory of a workload.

A graphical unit 210 can visually present information from graph database 425 to users according to various criteria, such as by application, application type, organization, and the like. The graphical unit 210 can visually organize information from graph database 425. In some embodiments, nodes that behave similarly can be clustered together (i.e., be put in a cluster). For example, when two nodes have similar edges (relationships) and behave in a similar fashion (e.g., run the same application, are associated with the same organization, and the like), the two nodes can be clustered together. Nodes that are clustered together can be visually presented as a shape (e.g., circle, rectangle, and the like), which denotes that there are a certain number of workloads fulfilling the same function, instead of presenting a shape for each workload in the cluster.

The policy compute engine 215 can use information in the graph database 425 to design security policies, also referred to herein as policies. The policy compute engine 215 can produce multiple security policies, each reflecting independent pieces of security logic that can be implemented by the policy compute engine 215. Security policies can implement security controls, for example, to protect an application wherever it is in a cloud computing environment (e.g., environment 100 in FIG. 1). A security policy can specify what is to be protected ("nouns"), for example, applications run for a particular organization. A security policy can further specify a security intent ("verbs"), that is, how to protect. For example, a security intent can be to implement Payment Card Industry Data Security Standard (PCI DSS) network segmentation requirements (a regulatory requirement), implement security best practices for databases, implement a whitelist architecture, and the like. By way of further example, a security intent can be specified in a template by a user (responsible for system administration, security, and the like).

Cloud drivers 4501-450Z can serve as an interface between the policy compute engine 215 (having a centralized security policy) and cloud services 4601-4760Z. In other words, cloud drivers 4501-450Z implement the security policy using different facilities (e.g., APIs) and capabilities available from cloud services 4601-460Z. In an example embodiment, the cloud drivers 4501-450Z may act as a cloud connector 205 shown in FIG. 2.

Figure 5:
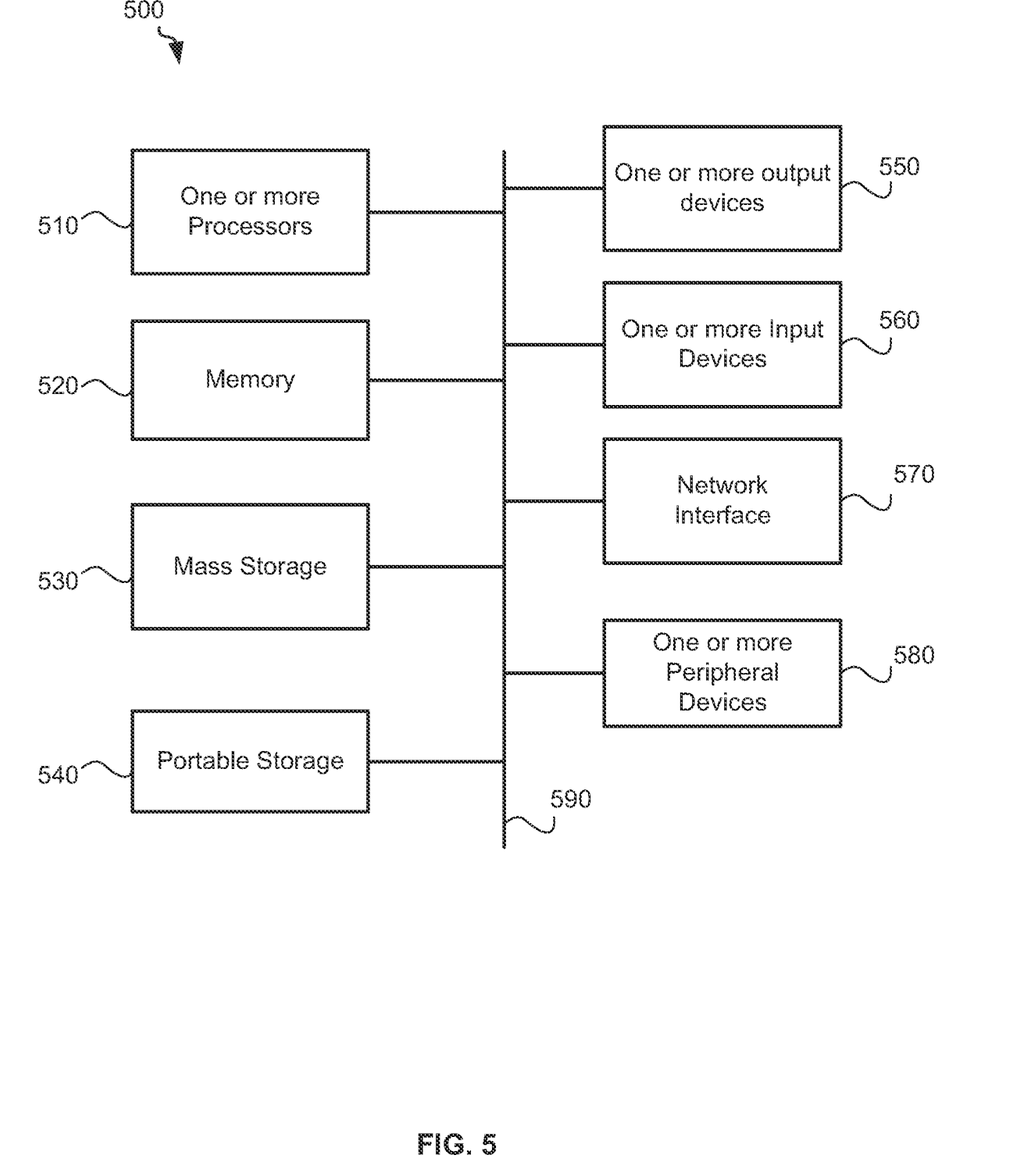
FIG. 5 shows a computing system that can be used to implement a system and a method for modeling topic-based message-oriented middleware, according to an example embodiment.

FIG. 5 illustrates an exemplary computing system 500 that may be used to implement embodiments described herein. The computing system 500 can be implemented in the contexts of the system 200 and the application controller 400. The exemplary computing system 50 of FIG. 5 may include one or more processors 510 and memory 520. Memory 520 may store, in part, instructions and data for execution by the one or more processors 510. Memory 520 can store the executable code when the exemplary computing system 500 is in operation. The exemplary computing system 500 of FIG. 5 may further include a mass storage 530, portable storage 540, one or more output devices 550, one or more input devices 560, a network interface 570, and one or more peripheral devices 580.

The components shown in FIG. 5 are depicted as being connected via a single bus 590. The components may be connected through one or more data transport means. The one or more processors 510 and memory 520 may be connected via a local microprocessor bus, and the mass storage 530, one or more peripheral devices 580, portable storage 540, and network interface 570 may be connected via one or more input/output buses.

Mass storage 530, which may be implemented with a magnetic disk drive or an optical disk drive, is a non-volatile storage device for storing data and instructions for use by a magnetic disk or an optical disk drive, which in turn may be used by one or more processors 510. Mass storage 530 can store the system software for implementing embodiments described herein for purposes of loading that software into memory 520.

Portable storage 540 may operate in conjunction with a portable non-volatile storage medium, such as a compact disk (CD) or digital video disc (DVD), to input and output data and code to and from the computing system 500 of FIG. 5. The system software for implementing embodiments described herein may be stored on such a portable medium and input to the computing system 500 via the portable storage 540.

One or more input devices 560 provide a portion of a user interface. The one or more input devices 560 may include an alphanumeric keypad, such as a keyboard, for inputting alphanumeric and other information, or a pointing device, such as a mouse, a trackball, a stylus, or cursor direction keys. Additionally, the computing system 500 as shown in FIG. 5 includes one or more output devices 550. Suitable one or more output devices 550 include speakers, printers, network interfaces, and monitors.

Network interface 570 can be utilized to communicate with external devices, external computing devices, servers, and networked systems via one or more communications networks such as one or more wired, wireless, or optical networks including, for example, the Internet, intranet, LAN, WAN, cellular phone networks (e.g., Global System for Mobile communications network, packet switching communications network, circuit switching communications network), Bluetooth radio, and an IEEE 802.11-based radio frequency network, among others. Network interface 570 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a USB.

One or more peripheral devices 580 may include any type of computer support device to add additional functionality to the computing system. The one or more peripheral devices 580 may include a modem or a router.

The components contained in the exemplary computing system 500 of FIG. 5 are those typically found in computing systems that may be suitable for use with embodiments described herein and are intended to represent a broad category of such computer components that are well known in the art. Thus, the exemplary computing system 500 of FIG. 5 can be a personal computer, handheld computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a central processing unit (CPU) for execution. Such media can take many forms, including, but not limited to, non-volatile media, volatile media, and transmission media. Non-volatile media include, for example, optical or magnetic disks, such as a fixed disk. Volatile media include dynamic memory, such as RAM. Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Thus, systems and methods for modeling topic-based message-oriented middleware are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. An enterprise security system for modeling topic-based message-oriented middleware (MoM), the system comprising:
   a cloud connector configured to:
   connect with a MoM system; and
   convert information associated with the MoM system into a standardized object model;
   wherein the standardized object model includes:
      a topic-based node associated with a topic of the MoM system;
      at least one producer application configured to provide one or more messages to the topic-based node, the one or more messages being related to the topic and generated by one or more producers associated with the at least one producer application; and
      at least one consumer application configured to receive the one or more messages from the topic-based node, the one or more messages being consumed by one or more consumers associated with the at least one consumer application;
   a graphical unit implemented on a computing system communicatively coupled to the MoM system, the computing system having one or more processors communicatively coupled to one or more memory units, the graphical unit configured to generate a standardized graph of relationships between the one or more producers and the one or more consumers over a period of time; and
   a policy compute engine configured to:
      create a policy;
      periodically analyze the standardized graph for at least one deviation from the policy; and
      in response to detecting the at least one deviation, issue an alert.

2. The system of claim 1, wherein the standardized graph is configured to generate data flow diagrams and infrastructure dependencies associated with the MoM system.

3. The system of claim 1, wherein the at least one deviation is indicative of an operational risk or a cyber risk.

4. The system of claim 3, wherein the at least one deviation is determined based on at least one of the following events: an unexpected change in usage, a new node, an unexpected change in a node, a new relationship between nodes, a threshold of communications exceeded, events occurring at a different time, a higher Service Level Agreement requirement, a Recovery Time Objective mismatch between nodes, and a Recovery Point Objective mismatch between nodes.

5. The system of claim 1, wherein the MoM system is associated with one of a private data center, a private cloud, and a public cloud.

6. The system of claim 1, wherein the policy compute engine is further configured to set permissions to control access to the topic.

7. The system of claim 1, wherein the policy compute engine is further configured to periodically review critical business functions visualized in the standardized graph.

8. The system of claim 1, wherein the policy compute engine is further configured to take a mitigating action in response to the alert.

9. The system of claim 1, wherein the MoM system includes at least one of the following: Kafka, IBM MQ, RabbitMQ, TIBCO Rendezvous, AWS Kinesis, Microsoft Azure Service Bus, Microsoft Message Queuing (MSMQ), NServiceBus, Simple Queue Service (SQS), Simple Notification Service (SNS), Advanced Message Processing System (AMPS), and one or more systems for relaying, routing, or transforming messages.

10. The system of claim 1, wherein the information received from the MoM system by the cloud connector includes a telemetry feed with events of the MoM system, the cloud connector being configured to convert the events into the relationships and summarize the relationships.

11. The system of claim 1, wherein the cloud connector is configured to:
   periodically:
      request a data snapshot of requests from the MoM system; or
      receive the data snapshot directly from the MoM system through one or more of the following: logs and accounting information;
   determine status information based on the data snapshot; and
   convert the status information into the standardized object model.

12. The system of claim 1, wherein the policy compute engine is further configured to create a report showing the relationships between the one or more producers and the one or more consumers of the MoM system.

13. The system of claim 1, wherein the policy is created by the policy compute engine based on the one or more producers, the one or more consumers, and the topic.

14. The system of claim 1, wherein the analyzing the standardized graph is based on one or more of the following: baselined historical data, a set of predetermined permissions, and regulatory requirements.

15. A method for modeling topic-based message-oriented middleware (MoM), the method comprising:
   connecting, by a cloud connector, with a MoM system;
   converting, by the cloud connector, information associated with the MoM system into a standardized object model, wherein the standardized object model includes:
      a topic-based node associated with a topic of the MoM system;
      at least one producer application, the at least one producer application providing one or more messages to the topic-based node, the one or more messages being related to the topic and generated by one or more producers associated with the at least one producer application; and at least one consumer application, the at least one consumer application receiving the one or more messages from the topic-based node, the one or more messages being consumed by one or more consumers associated with the at least one consumer application;

generating, by a graphical unit, a standardized graph of relationships between the one or more producers and the one or more consumers over a period of time;

creating, by a policy compute engine, a policy;

periodically analyzing, by the policy compute engine, the standardized graph for at least one deviation from the policy; and in response to detecting the at least one deviation, issuing, by the policy compute engine, an alert.

16. The method of claim 15, further comprising, generating, via the standardized graph, data flow diagrams and infrastructure dependencies associated with the MoM system.

17. The method of claim 15, further comprising setting, by the policy compute engine, permissions to control access to the topic.

18. The method of claim 15, further comprising creating, by the policy compute engine, a report showing the relationships between the one or more producers and the one or more consumers of the MoM system.

19. The method of claim 15, further comprising:
receiving, by the cloud connector, the information from the MoM system, wherein the information includes at least a telemetry feed with events of the MoM system;
converting, by the cloud connector, the events into the relationships; and
summarizing, by the cloud connector, the relationships.

20. An enterprise security system for modeling topic-based message-oriented middleware (MoM), the system comprising:
a cloud connector configured to:
connect with a MoM system;
receive information from the MoM system, wherein the information includes at least a telemetry feed with events of the MoM system;
convert the information associated with the MoM system into a standardized object model;
convert, the events into relationships; and
summarize the relationships;
wherein the standardized object model includes:
a topic-based node associated with a topic of the MoM system;
at least one producer application configured to provide one or more messages to the topic-based node, the one or more messages being related to the topic and generated by one or more producers associated with the at least one producer application; and
at least one consumer application configured to receive the one or more messages from the topic-based node, the one or more messages being consumed by one or more consumers associated with the at least one consumer application;
a graphical unit implemented on a computing system communicatively coupled to the MoM system, the computing system having one or more processors communicatively coupled to one or more memory units, the graphical unit configured to generate a standardized graph of the relationships between the one or more producers and the one or more consumers over a period of time; and
a policy compute engine configured to:
create a policy;
periodically analyze the standardized graph for at least one deviation from the policy;
in response to detecting the at least one deviation, issue an alert; and
create a report showing the relationships between the one or more producers and the one or more consumers of the MoM system.

* * * * *